(12) United States Patent
Hausman

(10) Patent No.: US 8,019,665 B2
(45) Date of Patent: Sep. 13, 2011

(54) VARIABLE PRICING FOR AND CONDITIONAL AVAILABILITY OF PROPOSALS FOR TRADING OF FINANCIAL INTERESTS

(75) Inventor: Andrew Hausman, Summit, NJ (US)

(73) Assignee: Bloomberg L.P.

( * ) Notice: Subject to any disclaimer, the term of this patent is extended or adjusted under 35 U.S.C. 154(b) by 1907 days.

(21) Appl. No.: 10/395,839

(22) Filed: Mar. 24, 2003

(65) Prior Publication Data

US 2004/0030632 A1 Feb. 12, 2004

Related U.S. Application Data

(60) Provisional application No. 60/366,910, filed on Mar. 22, 2002.

(51) Int. Cl.
*G06Q 40/00* (2006.01)
(52) U.S. Cl. .......................................... 705/35; 705/28
(58) Field of Classification Search ................... 705/35; 434/235
See application file for complete search history.

(56) References Cited

U.S. PATENT DOCUMENTS

| | | |
|---|---|---|
| 5,136,501 A | 8/1992 | Silverman et al. |
| 5,448,043 A | 9/1995 | Nakano et al. |
| 5,508,913 A | 4/1996 | Yamamoto et al. |
| 5,757,894 A | 5/1998 | Kay et al. |
| 5,761,386 A | 6/1998 | Lawrence et al. |
| 5,774,553 A | 6/1998 | Rosen |
| 5,842,921 A | 12/1998 | Mindes et al. |
| 5,845,266 A | 12/1998 | Lupien et al. |
| 5,905,975 A | 5/1999 | Ausubel |
| 5,924,082 A | 7/1999 | Silverman et al. |
| 5,924,083 A | 7/1999 | Silverman et al. |
| 5,963,923 A | 10/1999 | Garber |
| 5,978,485 A | 11/1999 | Rosen |
| 6,012,046 A | 1/2000 | Lupien et al. |
| 6,035,287 A | 3/2000 | Stallaert et al. |
| 6,049,772 A | 4/2000 | Payne et al. |
| 6,061,691 A | 5/2000 | Fox |
| 6,128,598 A | 10/2000 | Walker et al. |

(Continued)

FOREIGN PATENT DOCUMENTS

WO WO01/16830 A1 3/2001

OTHER PUBLICATIONS

Arbitrage Trading and Pricing of Municipal Bond Index Futurers by Hamilton, Thomas Robert 1990, Texas Tech University (0230) vol. 51/09—A Dissertation Abstracts International p. 3168:166 pages.*

(Continued)

*Primary Examiner* — Ella Colbert
*Assistant Examiner* — John A Anderson
(74) *Attorney, Agent, or Firm* — Frommer Lawrence & Haug LLP; Frank J. DeRosa

(57) ABSTRACT

Programs, methods, and systems for variable pricing and conditional availability of proposals for trading of financial interests through the use of reference indices. The invention provides programs, methods, and systems for associating a proposal for a trade in at least one financial interest with at least one other financial interest or index, which may serve as a reference for effecting a condition of the proposal, including for example an availability of terms for the proposal to other traders, the executability of the proposal, etc.

24 Claims, 5 Drawing Sheets

U.S. PATENT DOCUMENTS

| | | |
|---|---|---|
| 6,243,691 B1 | 6/2001 | Fisher et al. |
| 6,289,320 B1 | 9/2001 | Drummond et al. |
| 6,321,212 B1 | 11/2001 | Lange |
| 6,334,117 B1 | 12/2001 | Covert et al. |
| 6,343,272 B1 | 1/2002 | Payne et al. |
| 6,390,366 B1 | 5/2002 | Heidenreich et al. |
| 6,421,653 B1 | 7/2002 | May |
| 6,442,258 B1 | 8/2002 | Mashinsky |
| 7,136,834 B1 | 11/2006 | Merrin et al. |
| 2001/0025266 A1 | 9/2001 | Gastineau et al. |
| 2002/0107774 A1 | 8/2002 | Henninger et al. |
| 2002/0156718 A1 | 10/2002 | Olsen et al. |
| 2002/0178111 A1 | 11/2002 | Woodley |
| 2002/0194136 A1 | 12/2002 | Sullivan et al. |
| 2003/0004859 A1 | 1/2003 | Shaw et al. |
| 2003/0069821 A1 | 4/2003 | Williams |
| 2003/0069826 A1 | 4/2003 | Guidi et al. |
| 2003/0093360 A1* | 5/2003 | May ............... 705/37 |
| 2003/0093375 A1 | 5/2003 | Green et al. |
| 2003/0097328 A1 | 5/2003 | Lundberg et al. |
| 2003/0144947 A1 | 7/2003 | Payne |
| 2003/0216932 A1* | 11/2003 | Foley ............... 705/1 |

OTHER PUBLICATIONS

Letter of Daniel T. Brooks to Richard Ketchum of the Securities and Exchange Commission dated Sep. 8, 1986, pp. 31-70, Fed. Sec. L. Rep. p. 78, 997, 1986 WL 67657 (S.E.C. No—Action Letter).

* cited by examiner

VARIABLE PRICING FOR AND CONDITIONAL AVAILABILITY OF PROPOSALS FOR TRADING OF FINANCIAL INTERESTS

RELATED APPLICATION

This application claims the benefit of U.S. Provisional Application Ser. No. 60/366,910, filed 22 Mar. 2002 and entitled VARIABLE PRICING FOR AND CONDITIONAL SUSPENSION AND REINSTATEMENT OF ORDERS IN TRADING OF FINANCIAL INTERESTS. The complete contents of said provisional application, including the specification thereof in its entirety, is hereby incorporated in full as a part of this specification, by this reference.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

This application contains material relating to the trading of financial interests. The trading of some financial interests is regulated, as for example by the United States Government, the various State governments, and other governmental agencies within the United States and elsewhere. The disclosure herein is made solely in terms of logical and financial possibility and advantage, without regard to possible statutory, regulatory, or other legal considerations. Nothing herein is intended as a statement or representation of any kind that any method or process proposed or discussed herein does or does not comply with any statute, law, regulation, or other legal requirement whatsoever, in any jurisdiction; nor should it be taken or construed as doing so.

BACKGROUND OF THE INVENTION

The invention relates to trading of financial interests, and in particular to programs, methods, and systems for variable pricing and conditionally making available proposals for trading of financial interests.

SUMMARY OF THE INVENTION

The invention provides programs, methods, and systems for associating a proposal for a trade in at least one financial interest with at least one other financial interest or index, which may serve as a reference for effecting a condition of the proposal, including for example an availability of terms for the proposal to other traders, the executability of the proposal, etc.

For example, a term of the proposal is associated with a parameter of or otherwise associated with the other financial interest or index. In a preferred embodiment, the price of the proposal is associated with the parameter, for example with a price parameter, of the other financial interest or index. In such an embodiment, availability of the terms of the proposal, a price term associated with the proposal, or the executability of the proposal can depend upon the relationship of the price term of the proposal and a price or other parameter associated with the other financial interest or index.

The relationship between the price term of the proposal and the reference index may be static, as for example in a manner similar to that of a limit order, with the relationship being established between different financial interests; or the relationship may be dynamic, for example, a floating reference such as pegging, but again the relationship is between the financial interest of the proposal and another financial interest of index.

In a preferred embodiment, a trader entering a trading proposal, such as a bid or offer, for a financial interest in a computer trading system, is provided with the option of making the proposal contingent upon a specified relationship between a reference index and a reference index limit selected by the trader, and/or of tying a price term for the proposal to a reference index, so that the price term of the proposal floats with the reference index according to a specified relationship.

Any suitable value or parameter can be used as reference indices, including prices or other parameters associated with interests other than those for which a trade is proposed, or any other index. The same interest traded in another market, as for example in another country's exchange or on another electronic communications network (ECN) can also be used as a reference index. For example, prices or values associated with any financial interest or derivative, such as stocks, bonds, commercial paper, or commodities, and/or futures, options, or forwards may be used. Composite prices or indices such as the Dow-Jones or NASDAQ averages are further examples of suitable indices.

Indices can include interests of the same financial class as the interest for which trading is proposed. For example, a second stock may be designated as the reference index in a proposed trade of a first stock; a second bond in a proposal relating to a first bond; a third currency for a trade in first and second currencies, etc. For example, a trade in MicroSoft corporation stock can be proposed using a price associated with an actual or proposed trade in IBM corporation stock as an index.

Any value or other parameter associated with the reference index may be used. For example, various types of pricing data associated with the reference index, such as current best bid and/or offer, last open, last close, etc., can serve as indices in proposing trades. For indices which are not priced, such as for example composite price indices, the value of the index itself, or any derivative or other associated value or parameter, may be used.

In one embodiment the invention provides a computer readable medium or media for use within a computer system by traders of financial interests in conditionally making available terms for proposed trades. The system comprises a computer readable medium or media having programming stored thereon for causing the computer system to receive from a user of the computer system, such as a trader employed by a securities trading firm, terms for a proposed trade in a financial interest. The terms include an identification of a financial interest the user wishes to trade, a price at which the user wishes to trade the financial interest, an identification of a reference index, a designation of a reference index limit, and may include additional terms such as a quantity or order size. The programming causes the computer system to make available to other users of the computer system, such as for example potential trading counterparties, for so long as the reference index maintains a specified relationship to the reference index limit, terms of the proposed trade including the identification of the financial interest the user wishes to trade.

Terms are made available to other users in any suitable manner, as for example by causing the terms to be displayed on a computer screen or otherwise enabling access by computer terminals or systems available to the other users to a data storage in which the terms are stored, or by sending to or otherwise providing the data for the other users' terminals or systems electronically, as for example via a live data feed, instant message, or e-mail using a computer communications network, and allowing or causing the terms to be displayed on a computer screen or other output device.

Terms for a proposal can also be made available by, for example, making the proposal executable by other traders, so that upon satisfaction of the specified relationship between the reference index and the reference index limit the proposal is made available as an executable order upon action by another user; or making the proposal available for automatic matching in an automatic matching system; making the order available in a blind matching system; or making the terms available to other users as a request for proposal or indicator of interest.

The user entering the proposal can specify, for example, that the proposal will remain valid only so long as the reference index remains above, or below, a specified value, or within a specified range of values.

If a proposal is entered when a specified relationship between the reference index and the reference index limit is not satisfied, the proposal can be made available by holding the proposal until the relationship is satisfied, and making terms available to other system users at that time. If a proposal is made available to other users but then suspended when a specified relationship is no longer satisfied, it can be reinstated upon renewed satisfaction of the relationship.

Specification of conditions under which to make a proposal available to other traders, to suspend a proposal, and to reinstate a suspended proposal can be made by the user making the proposal, by the system, or by a combination of both the user and the system. For example, the user can specify conditions by designating a suitable reference index and index limit, and by specifying the relationship between the index and the index limit to be used in determining whether or when to make the proposal available to other users; or the system may provide defaults, which may optionally be overridden, for one or more of: the reference index, the index limit, and the relationship between the index and the index limit.

In another embodiment the invention provides a computer-readable medium or media for computer systems for use by traders of financial interests using relative pricing, for example by tying the proposed price of the financial interest to a reference index, or to any parameter associated with a reference index. The system comprises a computer readable medium or media having programming stored thereon for causing the computer system to receive from a user of the computer system terms for a proposed trade in a financial interest, the terms including an identification of a financial interest the user wishes to trade, an identification of a reference index, and a designation of a price operand. The medium or media causes the system to determine, using the designated operand and a current value of the reference index, a price term for the proposed trade; and to make available to other users of the computer system terms of the proposed trade including the identification of the financial interest the user wishes to trade and the determined price.

The computer readable medium or media can include programming for causing a computer to redetermine the price term for the proposed trade using the designated operand and a changed value of the reference index; and make available to other users of the computer system terms of the proposed trade including the identification of the financial interest the user wishes to trade and the redetermined price. For example, the computer system can periodically or continuously monitor the reference index, and periodically or continuously redetermine the price and make it available to other users; or the system can redetermine the price only at the command of the user making the proposal. Optionally the process of redetermining the price term and making it available to other traders can continue until the proposal is executed, cancelled, or otherwise suspended or terminated. Optionally a price may be determined only once, or set statically, and left indefinitely at that level, instead of being continuously, or dynamically, redetermined.

The operator and/or function to be used by the system with the operand and reference index in determining the price term for the proposed trade can be specified by the user proposing the trade, the system, or both. For example, the system may provide default options, preferably overridable, or a menu or selection of choices, for the operator and/or function, or the system may permit the user to specify the operator and/or function completely. Examples of operators and/or functions include multiplication or division by designated factor operands, or addition or subtraction of designated offsets. More complex operators and/or functions such as rates of change (in the mathematical calculus, referred to as derivatives), integration, etc., may also be used.

Proposed trades, or proposals, can include bids and/or offers of any type, optionally binding or negotiable, and any indications of interest in trades such as inquiries directed to specified potential counterparties or sets of counterparties. Optionally proposed trades are executable upon acceptance by other users.

The type of proposal to be entered by the user may be designated in any suitable fashion. For example, the user may enter data indicating that the proposed transaction is a bid, an offer, or any other type by entering data in an appropriate data input field on an interactive graphical user interface. The designation may also be made by the system, as for example by an overridable default, or implicitly, as for example by entry of a minimum price for a sale proposal or a maximum price for a purchase proposal.

Other embodiments of the invention provide a computer-readable medium or media useful in a computer system for both variable pricing and conditional making available of orders in trading of financial interests. In such embodiments the invention provides media useful in a computer system for use by traders of financial interests, the system comprising a computer readable medium or media having programming stored thereon for causing the computer system to receive from a user of the computer system, such as a trader, terms for a proposed trade in a financial interest. The terms include an identification of a financial interest the user wishes to trade, an identification of a reference index, a designation of a reference index limit, a designation of a price operand, and optionally additional terms such as a quantity or order size. The medium or media causes the system to determine, using the designated operand and a current value of the reference index, a price term for the proposed trade; and to make available to other users of the computer system terms of the proposed trade including the identification of the financial interest the user wishes to trade and the determined price, for so long as the reference index maintains a specified relationship to the reference index limit, terms of the proposed trade including the identification of the financial interest the user wishes to trade. Optionally the computer readable medium or media includes programming for causing a computer to redetermine the price term for the proposed trade using the designated operand and a changed value of the reference index; and make available to other users of the computer system terms of the proposed trade including the identification of the financial interest the user wishes to trade and the redetermined price, as described herein.

The invention further provides methods and computer systems for variable pricing and/or conditional availability of proposals for trading of financial interests as described herein.

Additional aspects of the present invention will be apparent in view of the description which follows.

BRIEF DESCRIPTION OF THE FIGURES

The invention is illustrated in the figures of the accompanying drawings, which are meant to be exemplary and not limiting, and in which like references are intended to refer to like or corresponding parts.

DETAILED DESCRIPTION OF THE PREFERRED EMBODIMENTS

Figure 1:
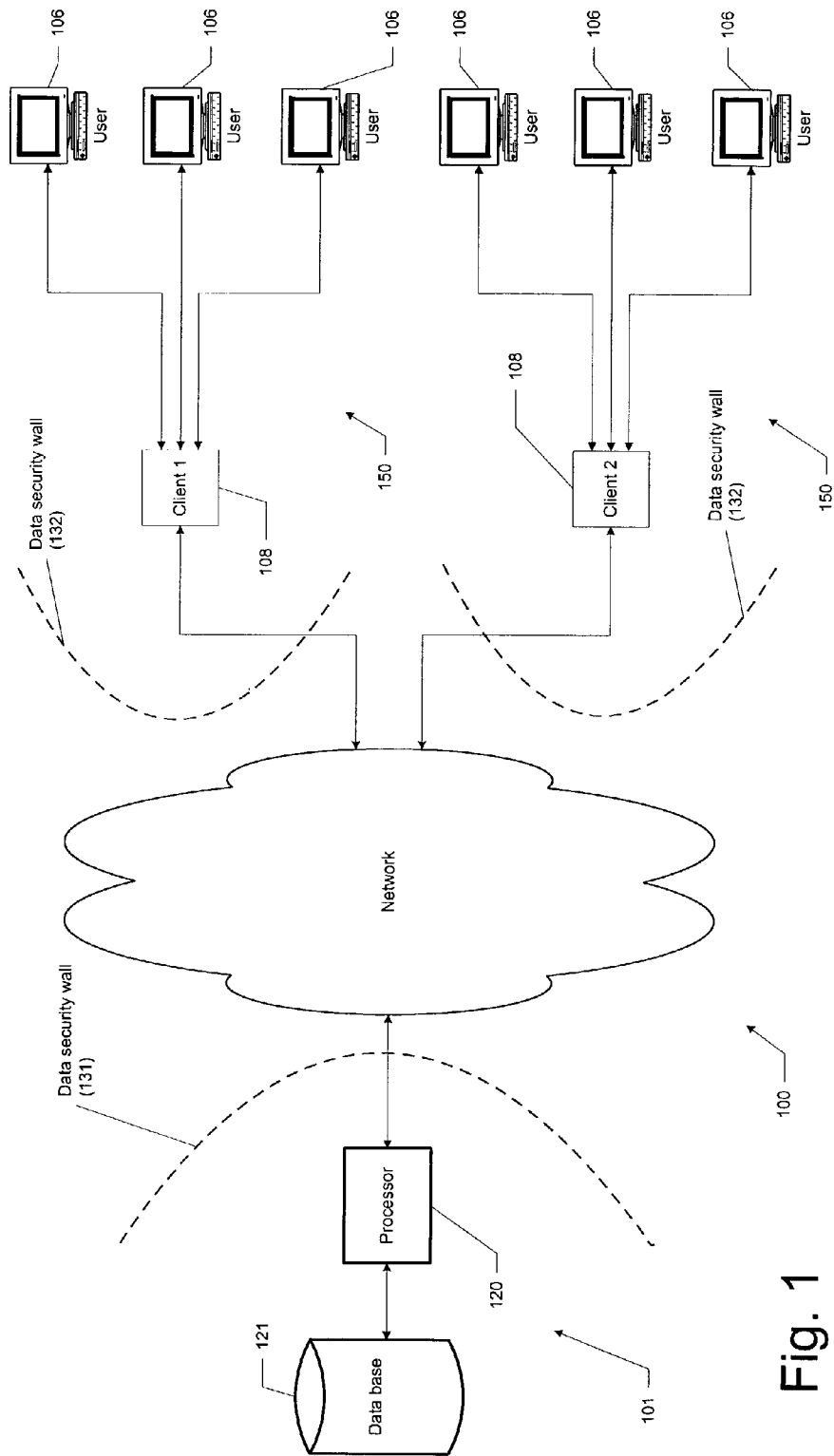
FIG. 1 is a schematic diagram of a preferred embodiment of a system for variable pricing and conditional suspension and reinstatement of orders in trading of financial interests according to the invention.

FIG. 1 is a schematic diagram of a preferred embodiment of a system suitable for implementation via a computer network of variable pricing and conditional suspension and reinstatement of orders in trading of financial interests according to the invention. System 100 comprises server system 101 and one or more client systems 150. Server system 101 includes processor 120 and database 121 and may be operated by, for example, a trading system operator such as Bloomberg L.P. Client systems 150 comprise servers 108 and one or more user terminals 106. Client systems 150 may be operated by, for example, financial trading firms, with user terminals 106 operated by individual traders.

In the example of FIG. 1, server system 101 is connected to client systems 150 by a computer communications network such as a proprietary electronic communications network (ECN) or a public network such as the Internet. In practice, any suitable communications link will serve, for example, any computer communications network or other direct or indirect connection. Client servers 108 are connected to user terminals 106 by any suitable communications link such as a local or wide area network (LAN or WAN). All connections are by any means or type suitable for use with the invention described herein, such as for example wired, fiber optic, or wireless telecommunications networks. Optionally, systems 100 include conventional security and communications devices such as data security walls 131, 132. Data such as terms for trading proposals are carried between terminals and servers in the form of electronic signals, which are encoded to represent financial data.

Figure 2:
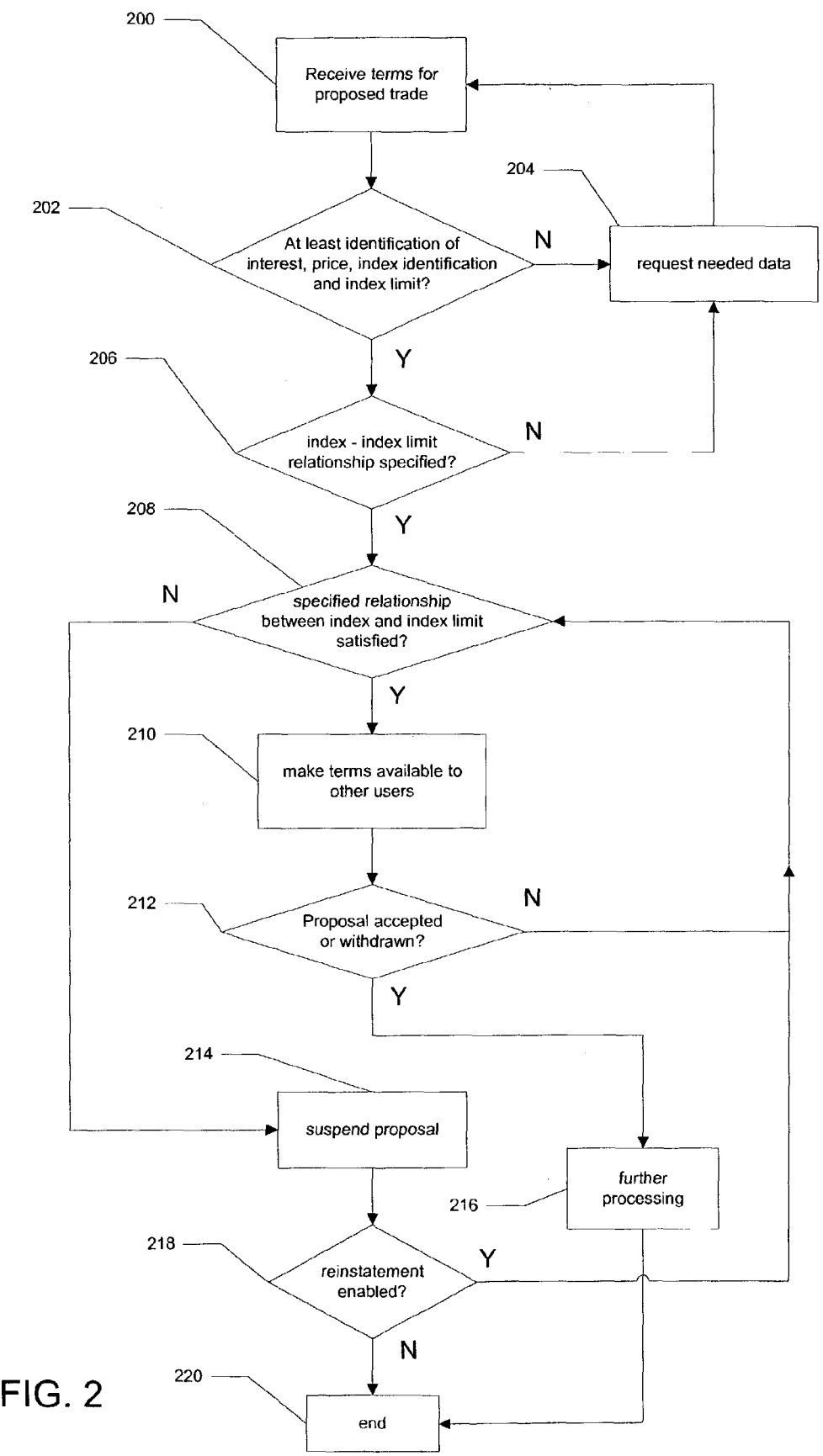
FIG. 2 is a schematic diagram of a data flow according to a preferred embodiment of a method of conditional suspension and reinstatement of orders in trading of financial interests according to the invention.

FIG. 2 is a schematic diagram of a data flow according to a preferred embodiment of a method of conditional suspension and reinstatement of orders for financial interests according to the invention, suitable for implementation on a system such as that shown in FIG. 1. At 200 the system such as system 100 receives terms for a proposed trade from a system user, for example a user of a user terminal 106. System 100 receives the terms by, for example, presenting a user an interface screen via user terminal 106, such as that shown in FIG. 4, which comprises a plurality of input fields 307-313 associated with suitable text or symbols to guide the user into entering suitable data via input devices such as keyboards and a mouse, a trackball, or other pointer. System 100, either locally via terminal 106, client server processor 108, or system server processor 120, or via network-connected user terminals, reads the data from the input fields and at 202 checks to ensure that properly formatted data has been entered for at least an identification of the interest to be traded; the type of proposal to be entered, for example, a bid or an offer; a price for buying or selling the interest; an identification of the index to be used, and an index limit to be used, with the index, in determining whether to make the proposal available to other system users or to suspend it.

One or more terms may also be supplied by system 100. For example, if the system provides defaults for types interests to be traded (for example, megawatt-hours on an electricity exchange, stocks on an equity exchange, or currency pairs to be traded on a currency exchange system), or for the index, the user may not be required to provide those items. Optionally where default terms are supplied by the system they are overridable by the user.

The determination at 202 of whether all required data has been received can also include the type of transaction to be proposed. For example, the user may enter data indicating that the proposed transaction is a bid, an offer, firm or negotiable, or any other type of proposal by entering data in an appropriate data input field. The designation may also be made by the system, as for example by a default, overridable or otherwise.

If any item(s) of required data have not been received, the user is prompted at 204 to provide missing items. The process 200-202-204 repeats until all required data are received by the system. Preferably the system 100 stores the data associated with the terms of the proposal entered by the user in memory such as data base 121 associated with the system.

At 206 the system determines whether an acceptable relationship between the index and the index limit have been specified. In general, an acceptable relationship includes any mathematically or financially logical relationship. For example, the system determines whether the index limit is an upper or lower limit, and whether the type of limit specified is compatible with the relationship specified for use in determining whether to make the proposal available to other system users. If the relationship is not sufficiently specified, either by user input, system programming and/or data, or a combination thereof, at 204 the user and/or system is prompted to supply or correct any required data. The process 202-206-204 continues until the condition 206 is satisfied.

If the index/index-limit is supplied in acceptable form, at 208 the system determines whether the relationship is currently satisfied. This can include, for example, obtaining a current value of the reference index, as for example by reading it from a specified data storage location, and checking the current value of the reference index to determining whether the current value satisfies the specified relationship to the index limit. For example, if the reference index is a stock price, a current price of the stock on a public or private exchange can be accessed and compared to the specified index limit; and if, for a buy order the price is lower than the index limit, then the proposed trade, or terms thereof, can be made available to other users. If the proposed trade is a sell order, and the current value of the reference stock price is above the index limit, the order or terms can be made available.

If the specified relationship is satisfied, at 210 the system releases, or makes available, terms of the proposal available to other users. To release or make terms of a proposal available is to make them available by any means, device, scheme, or process to any one or more users, either by actively writing or sending them to an appropriate data address or data structure on a client or third-party system (preferably secure) or by storing them within a data structure such as data base 121 and enabling one or more users 106 to access the data structure. For example, the terms may be made available by storing them on data base 121 in such a manner that they may be accessed by users of terminals 106, for example by reading a current proposal listing, and thereafter displayed on a user display. Or, as another example, the proposal may be made available to other users by e-mailing or otherwise forwarding it to the users, for example, by writing it to one or more client servers 108 for retrieval by or further forwarding to a user at a terminal 106.

In some embodiments the terms are formatted according to a protocol, as for example the FINANCIAL INFORMATION EXCHANGE PROTOCOL (FIX) described in a document entitled FINANCIAL INFORMATION EXCHANGE PROTOCOL (FIX), Version 4.2 with Errata 20010501, published May 1, 2001, by FIX Protocol Limited; or the TICKET ORDER FEED PROTOCOL.

If the proposal, or some of its terms, are made available to other users at 210, at 212 a determination is made as to whether the proposal has been withdrawn by the entering user or acted upon by another user; or should for any other reason be rendered unavailable to other users. For example, the user entering the proposal can cancel, suspend, or withdraw the order on command, or another user of the system can accept the proposal, indicate an interest in accepting it, open negotiations, or take other action. If the proposal has been withdrawn or accepted, at 216 suitable further processing takes place. For example, a term of a suspended order may be tagged as temporarily withdrawn by associating a suitable flag with the term data, or the terms may be removed from a data structure available to other users and moved to a non-accessible data structure, or they may be deleted. If the order has been accepted by another user, the order data may be passed to a matching and/or closing process. Negotiations may be opened by similar means, coupled with enabling the potential trading users to negotiate.

If at 212 it is determined that there is no reason to render the terms of the order unavailable, it is redetermined at 208 whether the specified relationship between the index and the index limit have been satisfied, or are still satisfied. Process 208-210-212 continues until the relationship is no longer satisfied or the proposal is otherwise withdrawn.

If at 208 it is determined that the specified relationship between the index and the index limit is not satisfied, at 214 the order is suspended. That is, the order is made or held unavailable to other users, as for example keeping it off or removing it from a data structure available to other system users, or associating the term data with one or more flags indicating that it is not accessible and/or otherwise causing the order's terms not to be displayed at other users' terminals.

If it is possible for a proposal suspended at 214 to be reinstated, as for example if the user who entered the proposal has not canceled or suspended it, the determination at 208 whether the specified relationship between the index and the index limit is made again, and the process 208-218 repeats until the relationship is no longer satisfied and reinstatement is no longer possible, or the proposal is otherwise accepted or withdrawn at 212. If reinstatement is not possible, the process stops for the proposal.

Figure 3:
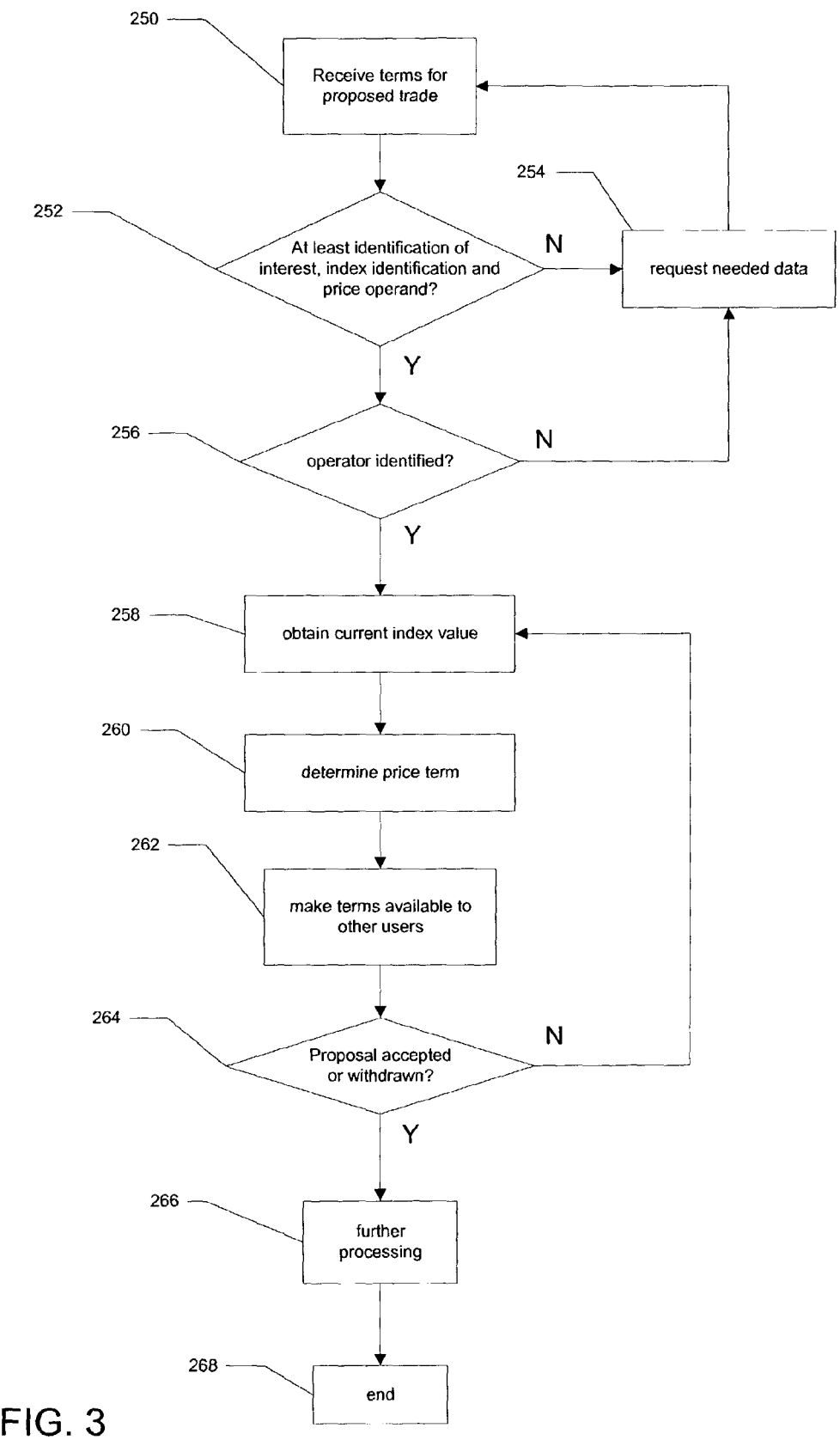
FIG. 3 is a schematic diagram of a data flow according to a preferred embodiment of a method of variable pricing of orders in trading of financial interests according to the invention.

FIG. 3 is a schematic diagram of a data flow according to a preferred embodiment of a method of variable pricing of orders according to the invention. At 250 the system receives terms for a proposed trade from a system user. The system reads term data and at 252 checks to ensure that properly formatted data has been entered for at least an identification of the interest to be traded; the type of proposal to be entered, for example, a bid or an offer; an identification of the reference index to be used, and a price operand to be used, with the index and a price operator, in determining a price for use with other proposal terms in making terms of the proposal available to other system users.

One or more terms may also be supplied by the system. For example, if the system provides defaults for interests to be traded (for example, on an electricity exchange), or for the index, the user may not be required to provide those items.

The determination at 252 of whether all required data has been received can also include the type of transaction to be proposed. For example, the user may enter data indicating that the proposed transaction is a bid, an offer, firm or negotiable, or any other type of proposal by entering data in an appropriate data input field. The designation may also be made by the system, as for example implicitly by the type or nature of the trading system, by suitable arrangement of input fields, or by default, overridable or otherwise.

If any item(s) of required data have not been received, the user is prompted at 254 to provide missing items. The process 250-252-254 repeats until all required data are received by the system. Preferably the system stores the data associated with the terms of the proposal entered by the user in memory such as data base 121 associated with the system.

At 256 the system determines whether an acceptable operator for use in setting, with the reference index and the price operand, a price term has been identified. The operator may be identified interactively by the user entering the proposal, or may be identified by the system, or by both, as for example by entry of the operand within a given input field on a user interface screen; or it may be set by the user by default, overridable or otherwise. The operator may be multiplicative, divisive, additive, subtracted, or of any other suitable type of function, including combinations of addition, subtraction, multiplication, division, integration, or any other mathematical function. The operand may be expressed in absolute terms (for example, a given dollar offset amount, above or below a current index value) or as a ratio (for example, so many dollars per index point, or a percentage).

If the operator is not sufficiently specified, at 254 the user and/or system is prompted to supply any required data. The process 252-256-254 continues until the condition 256 is satisfied and data stored appropriately.

At 258 a current value of the reference index is obtained, as for example by reading current value data from a suitable memory address, or consulting a real-time look-up table, or by reading a live data feed. The current value of the reference index may be obtained from any suitable source.

Once the reference index, the operator, the operand, and a current value of the index are available, at 260 the system determines a price term for the proposal. If, for example, the reference index is a stock price, and the operand is an additive offset, the system adds the operand to the current stock price value and the result is the price term to be used with the proposed transaction in the identified financial interest. As another example, if the reference index is a financial index such as an average bond price, and the operand is a ratio, the system multiplies the ratio by the current average bond price, and the result is the price term to be proposed.

The price term having been determined, it is associated with other terms of the proposal, as for example by being stored as a part of a single data string, with suitable headers and delimiters, optionally in a standard format such as according to the FIX protocol, and the proposed transaction is made available to other users of the system.

While the proposal is accessible to other users the system, from time to time, periodically or occasionally, obtains an updated vale of the reference index and uses the updated value to redetermine a price for the proposal. As the value of the index changes, the price term changes according to application of the specified operator to the operand. Thus the price term floats with the value of the index, as for example at a constant offset or at an established ratio. Optionally the price may be determined once, and left static, by not causing redetermination of the price.

The process 258-262 continues until at 264 the system determines that the proposal has been accepted or otherwise withdrawn. Withdrawn or accepted proposals are processed accordingly at 266.

Figure 4:
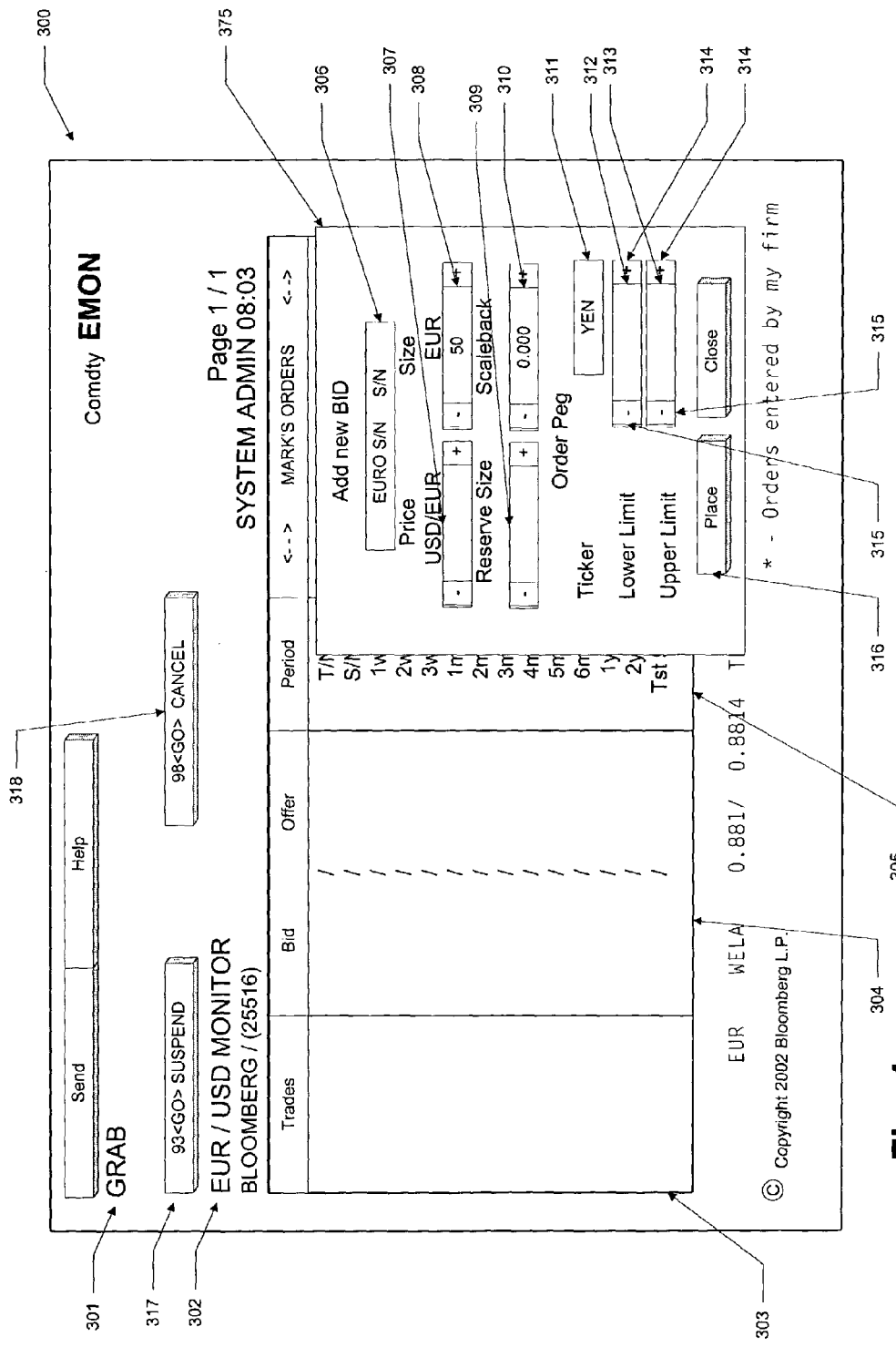
FIG. 4 is a schematic diagram of a user interface screen for conditional availability of proposals in trading of financial interests according to the invention.

FIG. 4 is a schematic diagram of a user interface screen for conditional suspension and reinstatement of proposals for trading of financial interests according to the invention. This user interface screen has been developed for use with the BLOOMBERG POWERMATCH® FX foreign exchange trading system. The BLOOMBERG POWERMATCH® FX foreign exchange trading system is configured generally in the manner shown in FIG. 1 and described above. Server system 101 is operated by a trading system operator such as Bloomberg LP. Client systems 150 are operated by clients such as foreign exchange trading firms and are connected to server system 101 by means of a secure, private ECN. User terminals 106 provide a user interface screen for presenting data and information relating to proposed trades, a keyboard, mouse, and/or other user input and control devices, and typically a processor. A user may enter input by selecting a desired input field, typically represented by a box or data line on a graphical interface screen, such as field 307 of FIG. 4, and entering data by use of the keyboard or other input device. Data so entered is encoded electronically for processing by the computer system.

Interface screen 300 enables a user to tie, or peg, an order stated in terms of a first currency for trading in a second currency, to a price limit in a third currency, so that terms for a posted order for the first currency are released, or made available, to other traders using the system when, or suspended for so long as, the price of the third currency maintains a specified relationship to the specified limit.

Interface screen 300 is accessed by entering the command "EMON" at command line 301 of any BLOOMBERG POWERMATCH® FX screen accessed at a terminal 106 connected to the BLOOMBERG POWERMATCH® FX system. In the example of FIG. 4, the user has entered commands to be presented with a display adapted for trading of Euros and United States dollars, as shown in data line 302.

Screen 300 of FIG. 4 allows both monitoring of the euro-dollar market and entry of trade proposals. Any active trade proposals in the market are shown in columns 303, 304. In column 303 proposed trading quantities are shown, if any. Quantities are expressed in terms of numbers of euros. Bid/offer prices are shown, if any, in column 304. Bids and offers are expressed in dollars per euro. A proposal may be entered for buying, selling, or both. Forward terms associated with proposals shown in columns 303, 304, are shown in column 305. Market depth may be shown by providing multiple lines of trading data for given prices and/or forward periods.

In the BLOOMBERG POWERMATCH® FX trading system all proposals are binding orders.

As indicated at 306, screen 300 of FIG. 4 is configured to accept a new bid to buy euros with dollars. Entering a "bid" command results in display of popup window 375. A user of a terminal 106 enters a bid to buy euros by entering a price, in terms of dollars the user is willing to pay per euro, at field 307, and a quantity of euros the user wishes to buy in field 308, of window 375.

Optionally the user may enter a reserve quantity at 309 and a reserve price change ("scaleback") amount at 310. The reserve price change and reserve quantity functions available by use of these options is more fully explained in commonly-owned U.S. patent application Ser. No. 09/839,529, entitled Price Change of Orders from Reserve in an Electronic Trading System, filed 20 Apr. 2001. The complete contents of said application, including the specification thereof in its entirety, is hereby incorporated in full as a part of this specification, by this reference.

As will be readily understood by those familiar with electronic trading systems, entry of offer orders is accommodated in parallel fashion, with differences in received input processed accordingly.

To place a conditional bid proposal, or to "tie" or "peg" the order to a price level in a reference currency, the user entering the order enters a ticker symbol or other identifier for the reference index at data input field 311. In the example, system has defaulted to, or the user has chosen to condition the proposal upon a price level in, yen. However, any other currency supported by the BLOOMBERG POWERMATCH® FX trading system can be used upon selection by the user. Similarly, a price in either one of the currencies to be traded in another market can be used as a reference index. The user can then enter reference index limits in the form of maximum and/or minimum price(s) for the designated reference index in the designated index in fields 312, 313, and select "Place" icon 316. Selection of icon 316 causes the data in fields 307-313 to be written to or made accessible to system 100 and begins processing at process step 200 in FIG. 2.

The user entering the order is provided with, among others, the options of independently suspending or canceling the order by selecting icons 317, 318. The user is also provided the option of incrementing or decrementing reference index limits by selecting "+" icons 314 and/or "−" icons 315. Selection of one of icons 314, 315, causes the system to increment or decrement the limit price in the adjoining input field by a predetermined amount selected, for example, by the system operator for the convenience of user traders.

For example, a user trader wishing to buy euros with dollars may make his/her offer to purchase euros contingent upon a price in yen. To do so the trader enters a dollar price he is willing to pay and a quantity of euros he is willing to buy in the "Price" and "Size" fields 307, 308; and enters "YEN" in the "Ticker" field 311 and an upper limit on the yen price in the upper limit field 313, a lower limit in lower limit field 312. The offer is made available to other traders so long as the current bid/ask price for yen (stated preferably in either dollars or euros) remains within the designated range between lower limit 312 and upper limit 313. When the best bid/ask prices for yen known to the system, which cycles continuously between process steps 208-210-212 checking the best yen bid and ask prices, as for example by reviewing all orders currently entered in the system, move outside the range specified in fields 312, 313, the trader's euro order is suspended.

Optionally the order is reinstated if the current yen price re-enters the designated range.

Figure 5:
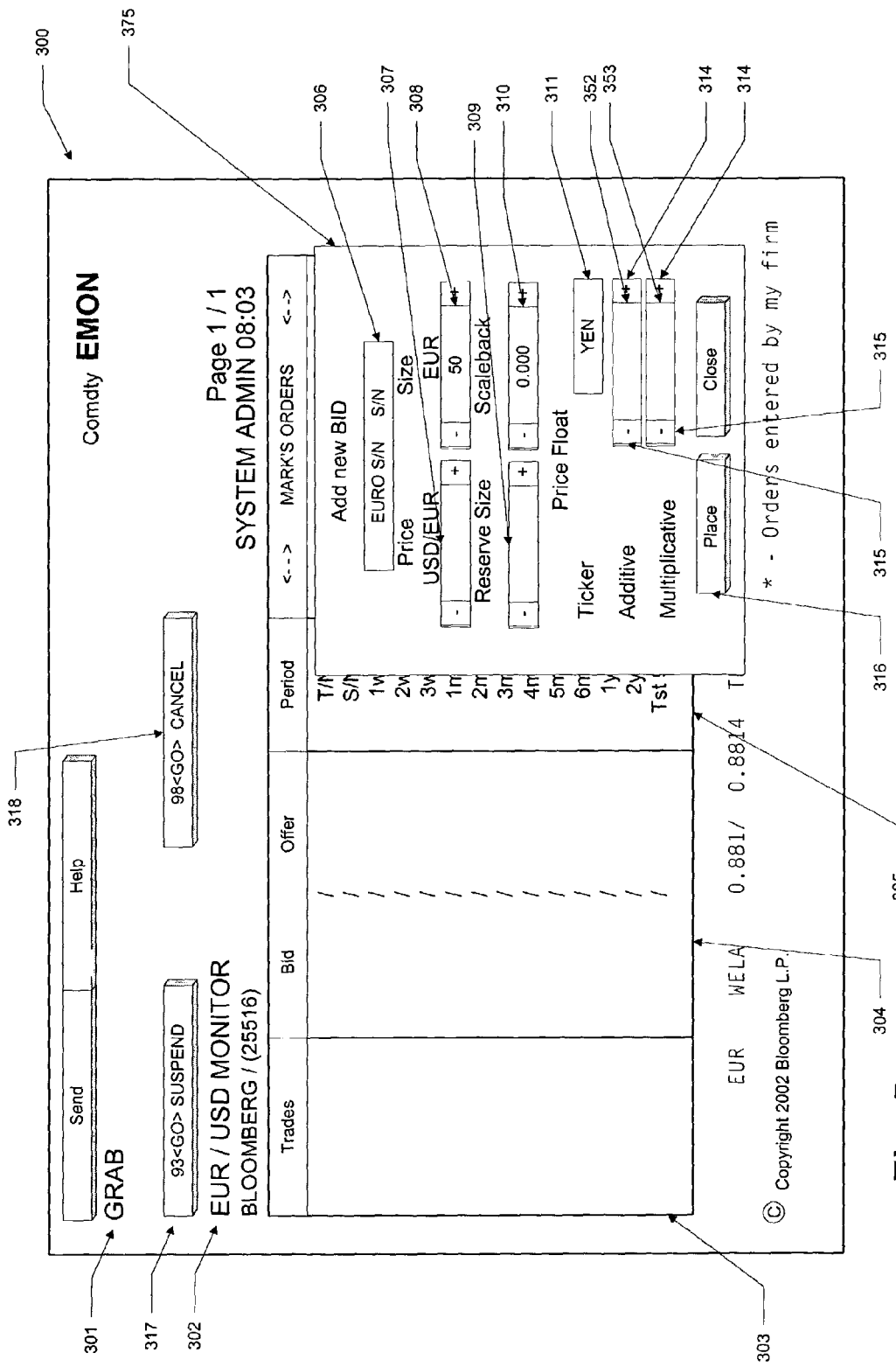
FIG. 5 is a schematic diagram of a user interface screen for variable pricing of proposals in trading of financial interests according to the invention.

FIG. 5 is a schematic diagram of a user interface screen for variable pricing of proposals for trading of financial interests according to the invention. This user interface screen is proposed for use as part of a trading system such as the BLOOMBERG POWERMATCH® FX foreign exchange trading system.

Interface screen 500 enables a user to tie, or peg, a bid or ask price for a first currency to be used purchasing or selling a second currency, to a designated price type stated in a third currency, so that the price stated for the first currency in terms of the second currency is determined relative to a designated price in the third currency.

Interface screen 500 is accessed by entering a suitable command at command line 301. In the example of FIG. 5, the user has entered commands to be presented with a display adapted for trading of Euros and United States dollars, as shown in data line 302.

Screen 500 of FIG. 5 allows both monitoring of the euro-dollar market and entry of trade proposals. Any active trade proposals in the market are shown in columns 303, 304. In column 303 proposed trading quantities are shown, if any. Quantities are expressed in terms of numbers of euros. Bid/offer prices are shown, if any, in column 304. Bids and offers are expressed in dollars per euro. A proposal may be entered for buying, selling, or both. Forward terms associated with proposals shown in columns 303, 304, are shown in column 305. Market depth may be shown by providing multiple lines of trading data for given prices and/or forward periods.

As indicated at 306, screen 300 of FIG. 5 is configured to accept a new bid to buy euros with dollars. Entering a "bid" command results in display of popup window 375. A user of a terminal 106 enters a bid to buy euros by entering a price, in terms of dollars the user is willing to pay per euro, at field 307, and a quantity of euros the user wishes to buy in field 308, of window 375.

Optionally the user may enter a reserve quantity at 309 and a reserve price change ("scaleback") amount at 310. The reserve price change and reserve quantity functions available by use of these options is more fully explained in the incorporated reference, U.S. patent application Ser. No. 09/839,529.

To peg or tie the price term for his proposal to a reference index so that the proposal price term floats relative the reference index, the user entering the order enters a ticker symbol or other identifier for the reference index at data input field 311. In the example, system has defaulted to, or the user has chosen to condition the proposal upon an unstated price level in, yen. However, any other currency supported by the BLOOMBERG POWERMATCH® FX trading system can be used upon selection by the user. Similarly, a price in either one of the currencies to be traded in another market can be used as a reference index. For example, through the use of suitable drop down menus, entry of designated "ticker" symbols, or the like, the user can select any suitable reference index, including, for example, one of a number of various price classes (e.g., current best bid, offer, or midpoint; open, or closing prices, or the like) at field 311.

The user can then designate the nature of the operand to be used in determining the price term for his trading proposal by entering data in either one of fields 352, 353. By entering a price step in field 352, the trader can designate that he/she wishes the price term for his proposal to be set at a constant stated offset from the reference yen price, so that as the reference yen price rises and/or falls, the price term for the trader's proposal rises and/or falls at a constant offset. By entering a ratio in field 353, the trader can designate that the price term for the proposal will float with the reference yen price by the stated ratio. For example, were a trader to enter "30" in field 352, the price term for his proposal would float at a constant "30" dollar level above the reference yen price. Were the trader to enter "1.50" in field 353, the price term would float at a constant 150% of the reference yen price.

Selection of "place" icon 316 causes the data in fields 307-311, 352, 353 to be written to or made accessible to system 100 and begins processing at process step 200 in FIG. 2.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention. Except to the extent necessary or inherent in the processes themselves, no particular order to steps or stages of methods or processes described in this disclosure, including the Figures, is implied. In many cases the order of process steps may be varied without changing the purpose, effect or import of the methods described.

What is claimed is:

1. A non-transitory computer readable medium or media having programming stored thereon for causing a computer system comprising at least one computer to perform a method comprising:

the at least one computer receiving terms for a proposed trade of a financial interest, the terms including: (a) an identification of the financial interest a user of the system wants to trade; (b) at least one reference index that is associated with at least one of (i) a financial interest other than the identified financial interest of the proposed trade and (ii) a financial index that is not priced; and (c) at least one reference index limit;

the at least one computer making the proposed trade available to one or more other users of the system for so long as the proposed trade and the at least one reference index limit maintain a specified relationship.

2. The medium or media of claim 1, wherein the specified relationship affects a price term for the proposed trade.

3. The medium or media of claim 1, wherein the specified relationship is dynamic.

4. The medium or media of claim 1, wherein the specified relationship is static.

5. A computer system for processing data related to trading of financial interests, the system comprising at least one computer programmed to at least:

receive terms for a proposed trade of a financial interest, the terms including: (a) an identification of the financial interest a user of the system wants to trade; (b) an identification of at least one reference index that is associated with at least one of (i) a financial interest other than the identified financial interest of the proposed trade, and (ii) a financial index that that is not priced; and (c) at least one reference index limit; and make the proposed trade available to one or more other users of the system for so long as the proposed trade and the at least one reference index limit maintain a specified relationship.

6. The system of claim 5, wherein the specified relationship affects a price term for the proposed trade.

7. The system of claim 5, wherein the specified relationship is dynamic.

8. The system of claim 5, wherein the specified relationship is static.

9. A method for trading of financial interests using at least one computer, the method comprising:
the at least one computer receiving terms for a proposed trade of a financial interest, the terms including: (a) an identification of the financial interest a user of the system wants to trade; at least one reference index that is associated with at least one of (i) a financial interest other than the identified financial interest of the proposed trade, and (ii) a financial index that is not priced; and (c) at least one reference index limit
the at least one computer making the proposed trade available to one or more other users of the system for so long as the proposed trade and the at least one reference index limit maintain a specified relationship.

10. The method of claim 9, wherein the specified relationship affects a price term for the proposed trade.

11. The method of claim 9, wherein the specified relationship is dynamic.

12. The method of claim 9, wherein the specified relationship is static.

13. The computer readable medium or media according to claim 1, wherein the relationship is between the reference index and at least one of the terms of the proposed trade.

14. The computer readable medium or media according to claim 1, wherein the financial index is a composite index based on a plurality of financial interests.

15. The computer readable medium or media according to claim 1, wherein the financial interest is for trading in a first market, and wherein the financial interest other than the identified financial interest is for trading in a market different from the first market.

16. The system of claim 5, wherein the relationship is between the reference index and at least one of the terms of the proposed trade.

17. The system of claim 5, wherein the financial index is a composite index based on a plurality of financial interests.

18. The system of claim 5, wherein the proposed trade of the financial interest is for trading in a first market, and wherein the financial interest other than the identified financial interest of the proposed trade is in a market different from the first market.

19. The method of claim 9, wherein the relationship is between the reference index and at least one of the terms of the proposed trade.

20. The method of claim 9, wherein the financial index is a composite index based on a plurality of financial interests.

21. The method of claim 9, wherein the proposed trade of the financial interest is for trading in a first market, and wherein the financial interest other than the identified financial interest of the proposed trade is in a market different from the first market.

22. A non-transitory computer readable medium or media having programming stored thereon for causing a computer system comprising at least one computer to perform a method comprising:
the at least one computer receiving terms for a proposed trade of a financial interest, the terms including (a) an identification of the financial interest a user of the system wants to trade (b) at least one reference index that is associated with at least one of (i) a financial interest other than the identified financial interest of the proposed trade and (ii) a financial index that is not priced; and (c) an operator and an operand for determining a price term of the financial interest of the proposed trade from a price parameter of the reference index;
the at least one computer determining the price term of the financial interest of the proposed trade from the price parameter of the reference index, the operand and the operator, and making the proposed trade available to one or more other users of the system at the determined price term.

23. A computer system for processing data related to trading of financial interests, the system comprising at least one computer programmed to at least:
receive terms for a proposed trade of a financial interest, the terms including: (a) an identification of the financial interest a user of the system wants to trade; (b) an identification of at least one reference index that is associated with at least one of (i) a financial interest other than the identified financial interest of the proposed trade, and (ii) a financial index that that is not priced; and (c) an operator and an operand for determining a price term of the financial interest of the proposed trade from a price parameter of the reference index;
determine the price term of the financial interest of the proposed trade from the price parameter of the reference index, the operand and the operator; and
make the proposed trade available to one or more other users of the system at the determined price term.

24. A method for trading of financial interests using at least one computer, the method comprising:
the at least one computer receiving terms for a proposed trade of a financial interest, the terms including: (a) an identification of the financial interest a user of the system wants to trade;
(b) an identification of at least one reference index that is associated with at least one of (i) a financial interest other than the identified financial interest of the proposed trade, and (ii) a financial index that that is not priced; and (c) an operator and an operand for determining a price term of the financial interest of the proposed trade from a price parameter of the reference index;
the at least one computer determining the price term of the financial interest of the proposed trade from the price parameter of the reference index, the operand and the operator; and
the at least one computer making the proposed trade available to one or more other users of the system at the determined price term.

* * * * *